Dec. 12, 1967     L. T. STORMON ET AL     3,357,405
PHEASANT RELEASE DEVICE
Filed March 14, 1966                       3 Sheets-Sheet 1
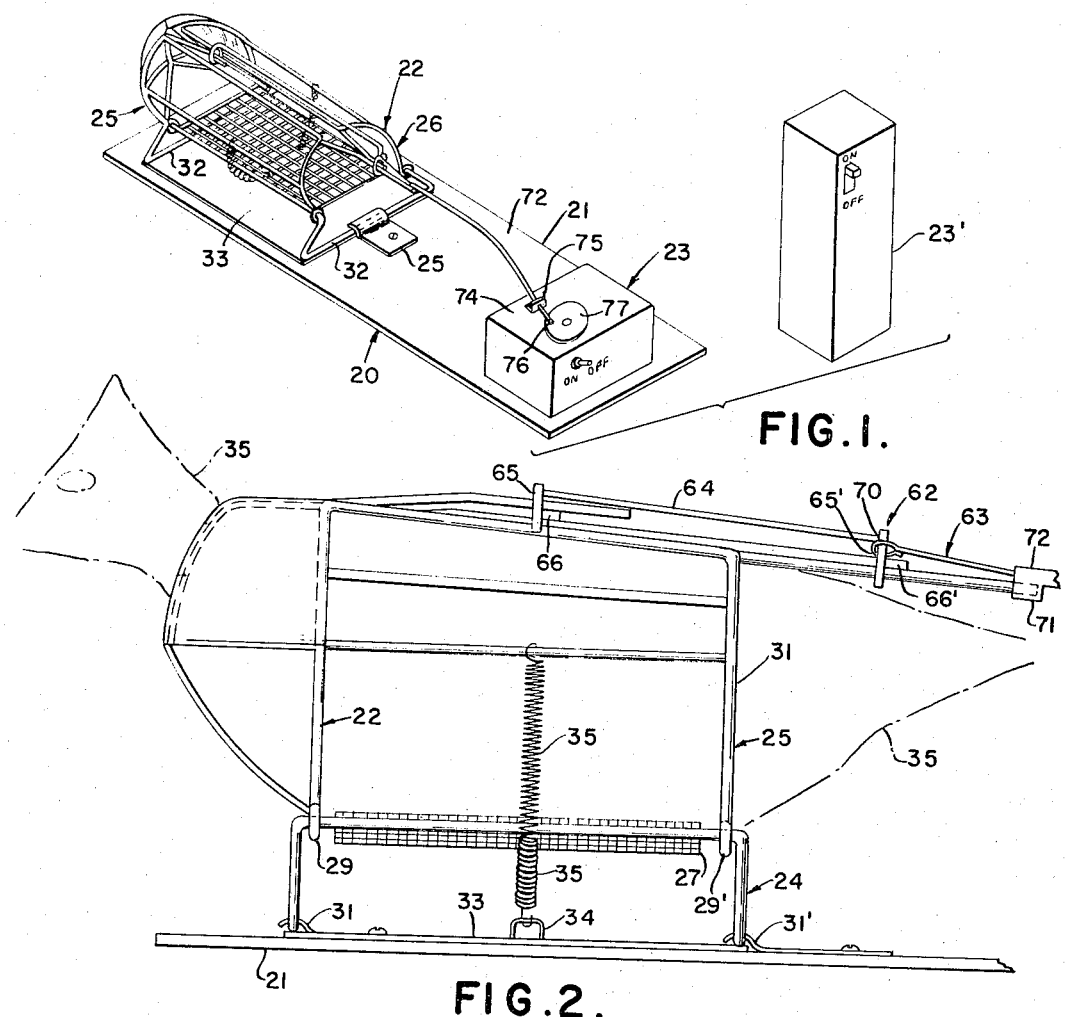
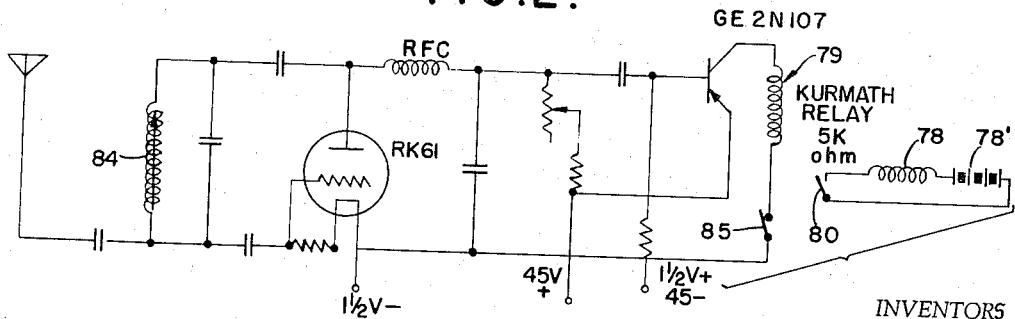
INVENTORS
Lester T. Stormon &
Robert D. Stormon
BY *Robert E. Kleve*
ATTORNEY INVENTORS
Lester T. Stormon &
Robert D. Stormon BY Robert E. Kleve
ATTORNEY INVENTORS
Lester T. Stormon &
Robert D. Stormon BY *Robert E. Kleeve*
ATTORNEY

United States Patent Office 3,357,405
Patented Dec. 12, 1967

3,357,405
PHEASANT RELEASE DEVICE
Lester T. Stormon, 1708 Magnolia Ave., Manhattan Beach, Calif. 90266, and Robert D. Stormon, Devils Lake, N. Dak. 58301
Filed Mar. 14, 1966, Ser. No. 533,907
5 Claims. (Cl. 119—15.6)

ABSTRACT OF THE DISCLOSURE

The invention relates to a radio controlled pheasant release device having a platform with a cage mounted to a platform which cage surrounds the pheasant and is adapted to spring open to release the pheasant. A radio receiver and a latch actuated means responsive to said receiver are also mounted to the platform, a transmitter carried by an operator, remote from the platform, transmitting a signal via the air waves to receiver and the receiver actuates the latch means allowing the cage to spring open and release the pheasant.

This invention relates to release devices, more particularly the invention relates to animal release devices.

It is an object of the invention to provide a novel release device for releasing game birds from a cage structure by remote control.

It is a further object of the invention to provide a novel device for releasing birds and other types of animals.

It is a further object of the invention to provide a novel pheasant release device which will release a pheasant in the field in response to a radio signal.

Further objects and advantages of the invention will become apparent as the description proceeds and when taken in conjunction with the accompanying drawings wherein:

FIGURE 1 is a perspective view of the pheasant release invention.

FIGURE 2 is a side elevational view of the first form of cage structure for releasing the pheasant.

FIGURE 3 is a schematic circuitry diagram of the radio receiver unit for actuating cage structure.

Figure 4:
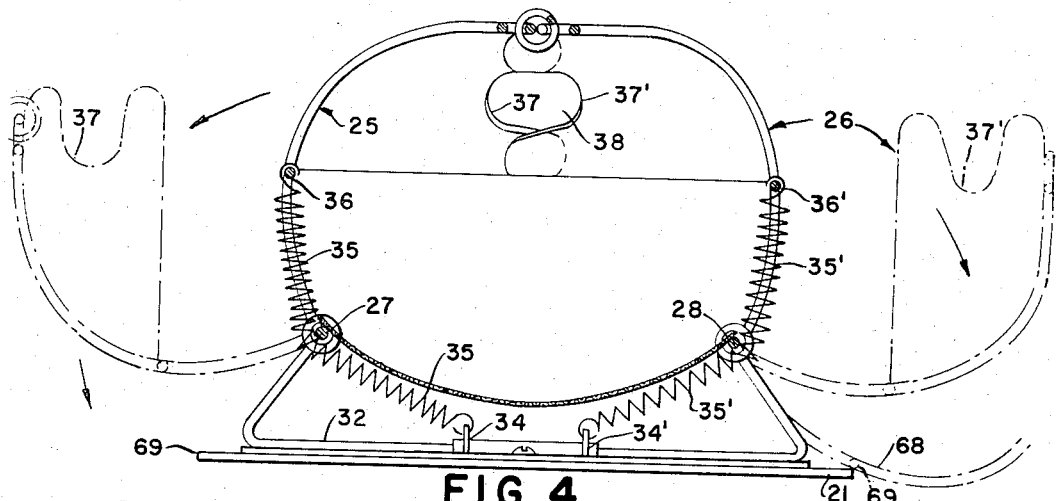
FIGURE 4 is a cross-sectional view of the first form of cage structure taken along line 4—4 of FIGURE 2 and illustrating the cage structure in open and closed position.
Figure 5:
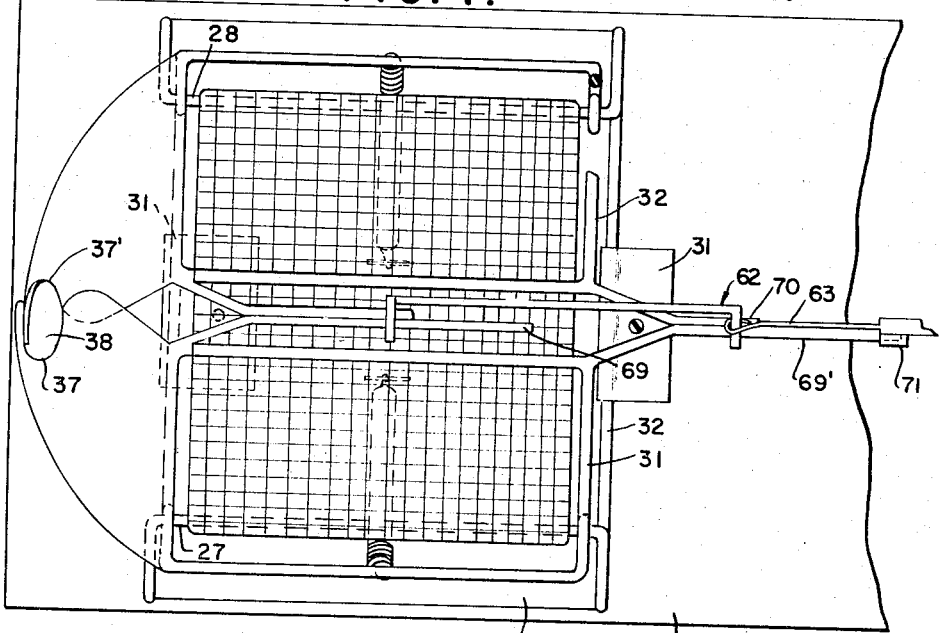
FIGURE 5 is a top plan view of the first form of cage structure.

Briefly stated the invention comprises a cage structure for caging a pheasant, said cage structure having a pair of half shells cooperating together to close about a pheasant. The half shells have notched out portions which form a collar about the neck of the pheasant when the shells are closed, said shells being spring biased away from each other, latch means holding the shells closed, a platform for mounting the cage thereon and a radio receiver unit mounted on the platform, a radio transmitter adapted to actuate the receiver unit, and said receiver unit adapted upon actuation to actuate the latch means to release the half shells and allow them to spring open to release the pheasant.

Referring more particularly to the drawings, in FIGURE 1 the pheasant release invention is illustrated comprising a pheasant release platform structure 20 having a platform 21 with a cage structure 22 and a radio receiver unit 23 mounted on the platform and a remote radio transmitter 23'.

The cage structure 22 comprises a base frame structure 24 and a pair of half shells 25 and 26 which are pivotally mounted to the base frame 24 on the horizontal members 27 and 28 of the base frame 24. The half shell 25 being pivotally mounted to member 27 of the base frame 24 by a pair of eyelets 29 and 29' and the half shell 26 being pivotally mounted to member 28 of the base frame 24 by eyelets 30 and 30'.

The base frame 24 is detachably secured to the platform 21 by a pair of spring clips 31 which have hooked portions 31' which hook over the base rods 32 of the base frame 24.

A plate 33 is fixed to the base rods 32 of the base frame. The plate 33 has a pair of loops 34 and 34', and a pair of coil springs 35 and 35' are hooked at their one ends to the loops 34 and 34' and at their other ends to rods 36 and 36' of the half shells 25 and 26, respectively to urge the half shells apart from their position illustrated in solid lines in FIGURE 4 to positions shown in dashed lines in FIGURE 4.

At the forward end of the half shells 25 and 26 are a pair of rounded notches 37 and 37' which when the half shells are closed or pivoted together about their respective axes 27 and 27' to their position illustrated in solid lines in FIGURE 4, the notches cooperate to form a hole 38 which is about ¾ inch in diameter.

The hole 38 is intended to be large enough to surround the neck of the pheasant with some space to spare and be smaller than the head of the pheasant so that the pheasant can not back his head out of the hole 38.

A rectangular screen 39 is fixed to the horizontal members 27 and 28 to provide a floor for the pheasant to stand on while caged between the half shells 25 and 26. The screen provides an apertured surface for the pheasant to insert his claws.

Modified cage structure

Figures 7, 10:
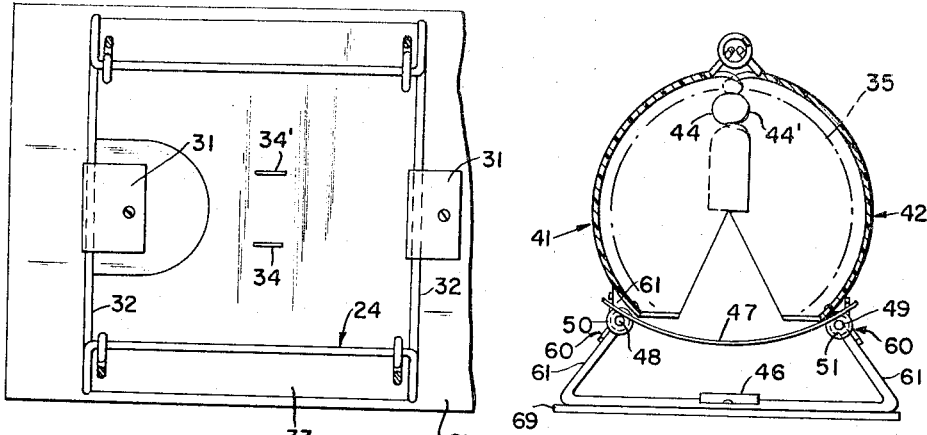
FIGURE 7 is a cross-sectional view of the first form of cage structure taken along line 7—7 of FIGURE 2.
FIGURE 10 is a cross-sectional view of the second form of cage structure taken along line 10—10 of FIGURE 8.
Figures 8, 11:
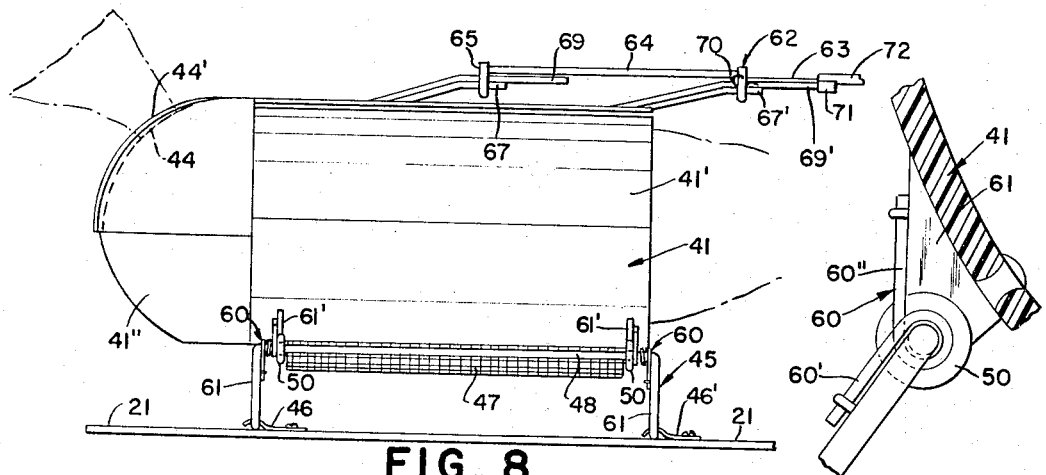
FIGURE 8 is a side elevational view of the second form of cage or container structure.
FIGURE 11 is a cross-sectional view of the spring biasing structure for the half shells of the second form of cage structure taken along line 11—11 of FIGURE 8.
Figure 9:
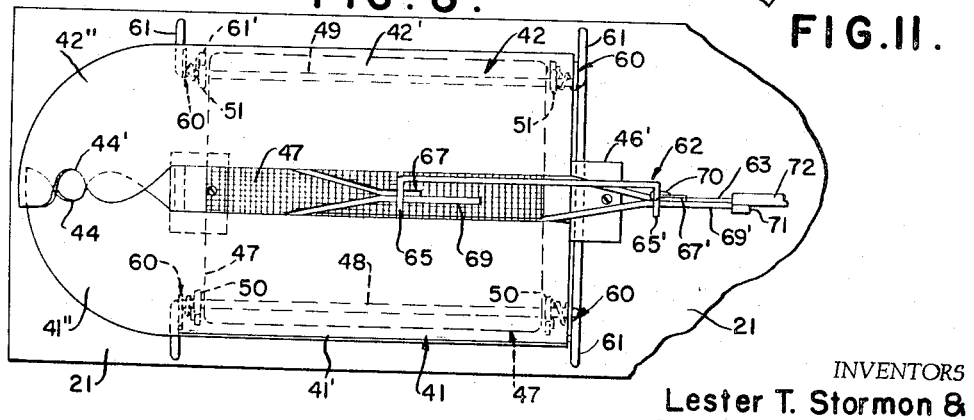
FIGURE 9 is a top plan view of the second form of cage structure.

In the modified cage structure 40 illustrated in FIGURES 8–11, inclusive, the half shells 41 and 42 are formed of smooth plastic sheet material so that the feathers of the pheasant will not catch on the half shells 41 and 42. The half shells 41 and 42 have cylindrical sheet body portions 41' and 42' respectively which surround the body of the pheasant and rounded front portions 41" and 42". The half shells have notched out portions 44 and 44' which surround the neck of the pheasant when the shells are closed as illustrated in FIGURES 8–10, and which notched portions 44 and 44' form a hole which is smaller than the head of the pheasant so that the pheasant cannot back his head out of the hole. The base frame 45 is the same as the base frame 24 and is detachably secured to the platform 21 with clips 46 and 46', similar to clips 31 and 31'. The base frame 45 also has a rectangular screen 47 fixed to horizontal members 48 and 49 for the pheasant to stand on while held between the shells 41 and 42.

The half shells are spring biased to pivot outwardly away from one another about the axis of horizontal members 48 and 49, by loop springs 60. The loop springs 60 have their one legs 60' fixed to the inclined rod portions 61 of the base frame 45, and their other legs 60"

fixed to flanges 61' on the half shells 41 and 42. The half shell 41 is pivotally mounted to members 48 by loops 50, which are fixed to the shell 41 via flanges 61; and shell 42 is pivotally mounted to member 49 by loops 51 which are fixed to shell 42.

*Latch mechanism*

The first form of shell structure formed of half shells 25 and 26, and the second form of shell structure formed of half shells 41 and 42 have the same type of latch mechanism 62 although other types of latch mechanism may be employed.

The latch mechanism 62 is operated by the wire 63, when the wire 63 is pulled rearwardly. This pulls the rod 64 which has two loops 65 and 65' fixed thereto in spaced relation, rearwardly. The rearward movement of the loops 65 and 65' releases the fingers 66 and 66' fixed to half shell 26 in the case of the first form, and releases fingers 67 and 67' in the case of the modified form of cage structure, thereby allowing the half shells 25 and 26 to spring open to form their closed position illustrated in FIGURE 4 in solid lines, to a position shown in dashed lines and identified by numeral 68 in FIGURE 4.

When both shells 25 and 26 are fully open, they will both rest against the side edge 69 of the platform 21, in the manner as illustrated for shell 26 by the dashed lines 68.

Similarly, the half shells 41 and 42, in the modified shell structure, will spring open in the same manner as illustrated in FIGURE 4.

The rod 64 and its loops 65 and 65' will ride with the shell 25, in the first form, and will ride with the shell 41 in the modified form, being carried by fingers 69 and 69' of the shells 25 and 41 respectively.

The cage structure of the first form and the modified form may be attached and detached engaging and disengaging the rod members 32 from the spring clips 31 in the case of the first form and by detaching rod members 32 of frame 45 from clips 46 and 46' in the case of the modified form, so that the pheasant may be placed in cages and the platforms 21 may be left in the field and reloaded with new cages carrying pheasants.

In detaching and attaching the cage structure in both the first form and modified form, it is also necessary to engage and disengage the hook 70 at the end of the wire 63 from the loops 65' and detach the rubber socket 71 which is frictionally fit over the end of the finger 69'.

The rubber socket is fixed to one end of the plastic rubber sleeve 72. The other end of the plastic rubber sleeve 72 is fixed to the top 74 of the radio receiver unit 23, by flange 75, with the wire 63 passing through the flange 75 and attached to a pin 76 on the outer edge of gear 77. Gear 77 is connected in driving relation to a motor 78, through a suitable gear reduction.

*Radio transmitter and receiver units*

The radio receiver unit 23, which is mounted on the platform 21 has an electrical circuitry as illustrated in FIGURE 3, with a relay 79 which activates to close switch 80 which energizes motor 78, through batteries 78', and the motor 78 drives gear 77 counterclockwise from its position illustrated in FIGURE 1, and the driving of the gear 77 counterclockwise pulls the wire 63 rearwardly which pulls the latch rod 62 rearward releasing the half shells 25 and 26, in the first form, and the half shells 41 and 42, in the case of the modified form, allowing the shells to spring open releasing the pheasant so that it can fly.

The relay 79 is activated by a radio signal receiver from transmitter unit 23', through the antenna 80 of the receiver unit and amplified by the radio receiver circuitry system.

Figure 6:
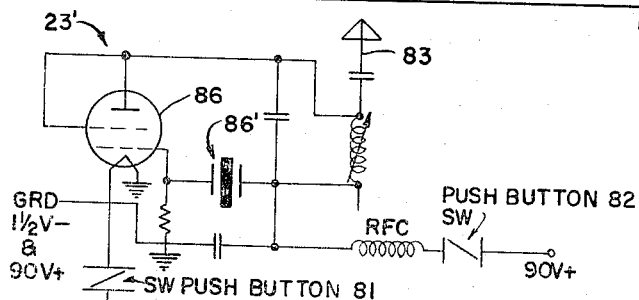
FIGURE 6 is a schematic circuitry diagram of the radio transmitter of the invention.

The radio transmitter 23' shown in FIGURE 6 is a single tube carrier wave transmitter having a 1AG4 tube identified by numeral 86 and powered by batteries 86'.

The radio transmitter unit 23' is turned on by push button switch 81 and the operator will press push button switch 82 which activates the unit causing it to transmit a radio signal through its antenna 83 to the radio receiver unit 23 to activate the relay 79.

The radio receiver unit has a signal receiving range which is adjustable by the tuning tank coil 84. It is intended that the receiver unit shall have a relatively short range, for example say 50 or 250 feet, so that several cages with their receiver unit may be placed at various different locations in field, known only to the operator, and with each cage receiver unit spaced beyond the range of the next cage and receiver unit, so that as the hunter and the operator go into the field, the hunter will not known where the birds are, and only one cage will be fired or opened at a time, consequently only one bird will be released at a time.

After the gear 77 has been driven by the motor 78 sufficiently counterclockwise from its position shown in FIGURE 1, to release the half shells another pin or gear 77 will open switch 85 which turns off the receiver unit. The unit will be manually reset afterwards, by manually rotating gear 77 clockwise back to its position shown in FIGURE 1.

The operator will normally press button 82, when the hunter is in range which will activate the relay 79, and open the cage of the receiver unit within its range.

The plastic shells 41 and 42 loosely conform to the pheasant's shape indicated by numeral 35. Also, the wire frame shells 25 and 26 similarly conform to the pheasant's shape indicated by numeral 35.

Thus, it will be seen that a novel radio control pheasant release device has been provided which will release pheasants in the field, by a radio signal allowing the bird to fly and which device may be operated for private hunting parties and the like.

It will be obvious that various changes and departures may be made to the invention without departing from the spirit and scope thereof and accordingly it is not intended that the invention be limited to that specifically described in the specification or illustrated in the drawings but only as set forth in the appended claims.

What is claimed is:

1. An air wave animal release device comprising a platform, a cage, an air wave receiver, an electrically actuated latch means responsive to said air wave receiver mounted to said platform, said cage comprising a pair of half shells adapted to surround an animal and be latched together by said electrically actuated latch means and spring biased to open, said half shells having a notched out front portion adapted to surround the neck of the animal when said shells are closed and form a hole of a smaller size than the head of said animal, an air wave transmitter remote from said platform and adapted to transmit a signal via the air waves to said air wave receiver, said receiver being adapted to respond to said signal to electrically actuate said electric latch means to unlatch said half shells of said cage to allow said shells to spring open to release said animal.

2. An air wave animal release device according to claim 1 wherein said half shells are mounted on separately spaced axes and are spring biased to open outwardly away from one another for said opening of said cage to release said animal.

3. An air wave animal release device according to claim 1 wherein said cage is detachably hooked to said platform and detachably connected to said receiver.

4. An air wave animal release device comprising a support said support having a cage, an air wave receiver, and an electrically actuated latch means mounted on said support, said cage comprising a pair of half shell means contoured to surround and receive an animal therein, and latched together by said electrically activated latch means and spring biased to open, said cage being detachable from said support and said receiver, an air wave transmitter remote from said support and adapted to transmit a signal via the air waves to said air wave receiver, said receiver being adapted to respond to said signal to electrically actuate said latch means to unlatch said shell means to allow them to spring open and release the animal.

5. An animal release device according to claim 4 wherein said receiver includes means automatically turning off the receiver after its latch means has been activated to unlatch.

References Cited

UNITED STATES PATENTS

| | | | |
|---|---|---|---|
| 2,504,763 | 4/1950 | Voecks | 119—15.6 |
| 2,642,036 | 6/1953 | Stuart | 119—15.6 |
| 2,800,104 | 7/1957 | Cameron et al. | 119—29 |
| 2,886,750 | 5/1959 | Vogel | 318—16 |
| 3,063,412 | 11/1962 | Colsher et al. | 119—15.6 |

HUGH R. CHAMBLEE, *Primary Examiner.*

SAMUEL KOREN, *Examiner.*